United States Patent [19]

Giulie

[11] 4,243,458

[45] Jan. 6, 1981

[54] METHOD OF MAKING PREFABRICATED LAMINATING PACKET WITH TAB

[75] Inventor: Joe D. Giulie, Palo Alto, Calif.

[73] Assignee: General Binding Corporation, Northbrook, Ill.

[21] Appl. No.: 70,836

[22] Filed: Aug. 29, 1979

Related U.S. Application Data

[62] Division of Ser. No. 784,668, Apr. 5, 1977, Pat. No. 4,185,405.

[51] Int. Cl.³ .................... B32B 31/20; G09F 3/00
[52] U.S. Cl. ......................... 156/247; 40/2 R; 40/2.2; 40/10 D; 40/159; 156/293; 156/300; 156/303.1; 156/344; 156/584; 428/33; 428/77
[58] Field of Search ............ 156/228, 277, 293, 299, 156/300, 303.1, 441.5, 538, 583.1, 344, 584, 247; 40/2 R, 2.2, 10 D, 27, 159, 359, 360, 21 R, 158 R; 428/33, 77; 206/484; 283/7; 354/179

[56] References Cited

U.S. PATENT DOCUMENTS

| | | | |
|---|---|---|---|
| 862,823 | 8/1907 | Holmes | 354/179 |
| 1,208,558 | 12/1916 | Holst | 354/179 |
| 1,823,295 | 9/1931 | Sever | 354/179 |
| 2,507,659 | 5/1950 | Zalkind | 156/247 |
| 3,419,137 | 12/1968 | Welck | 206/484 |
| 3,453,165 | 7/1969 | Isbey et al. | 156/300 |
| 3,664,910 | 5/1972 | Hollie | 283/7 |
| 3,674,614 | 7/1972 | Templeton | 40/2.2 |
| 3,698,303 | 10/1972 | Huber | 40/2.2 |
| 3,709,524 | 1/1973 | McKee et al. | 283/7 |
| 3,855,033 | 12/1974 | Staats | 283/7 |
| 3,918,188 | 11/1975 | Drower et al. | 40/158 |
| 3,943,031 | 3/1976 | Krueger et al. | 156/583.1 |
| 4,112,603 | 9/1978 | Giulie | 40/2 R |
| 4,158,587 | 6/1979 | Keller et al. | 156/247 |
| 4,172,750 | 10/1979 | Giulie | 156/583.1 |

*Primary Examiner*—Caleb Weston
*Attorney, Agent, or Firm*—Hill, Van Santen, Steadman, Chiara & Simpson

[57] ABSTRACT

A prefabricated laminating packet is provided having two laminating sheets thereon with a pull tab detachably attached thereto adapted for use in laminating machines. In accordance with a preferred embodiment of the invention, the pull tab has a series of notches therein which serve to locate the packet within a laminating machine and also which enable the machine to work only with packets designed for that particular machine.

9 Claims, 17 Drawing Figures

METHOD OF MAKING PREFABRICATED LAMINATING PACKET WITH TAB

This is a division of application Ser. No. 748,668 filed Apr. 5, 1977 now U.S. Pat. No. 4,185,405.

SUMMARY OF THE INVENTION

Laminating machines have been known in the past but ordinarily such machines have required several manipulative steps to perform the desired laminating operation and frequently require a skilled operator.

Machines also now exist which laminate packets of laminating film sealed at one end. These packets typically require a special carrier to encase them during the laminating process. The carrier is typically a cardboard folder coated with silicon so that it will not stick. The carrier is awkward to load and unload, is expensive and has a limited life. It also requires a longer heating time because the heat must be transferred through the carrier. After the lamination is complete the packet must be left in the carrier undisturbed for a cooling period of 30 seconds or so, because the carrier traps heat inside.

In accordance with the present invention, prefabricated packets are provided which comprise a pair of laminating sheets which are held together in proper relationship at at least one end thereof and with a pull-off tab attached to the laminating sheets adjacent the joined end. By attaching the two sheets together at one end, one provides automatic alignment of the two sheets so that no skill is necessary on the part of the operator. The pull tab at one end thereof enables the operator to utilize the machines designed for use with such packets and the use of a packet with a peel off tab makes a carrier unnecessary. The tab extends into the pull rolls of the laminating machine so that where the packet receives the proper amount of heat, it may be pulled thru the pressure rollers to complete the laminating process. The tab is then peeled off.

The advantages of the laminating packet with a tab are fast direct heating of the laminating film, no longer cooling period and ease of loading.

Packets with tabs of any packet length may be laminated in a given laminating machine without the need for long expensive carriers.

In accordance with one embodiment of the invention, a plain tab is provided which stays cool, so that the operator can easily grasp the tab and pull the packet through the machine.

In accordance with another embodiment of the invention, the tab at the end of the packet has a series of notches therein which serve the dual purpose of locating the packet accurately within a laminating machine with the tab between the pressure rollers and also serve to prevent operating the machine with a packet not designed for that particular machine.

In accordance with another embodiment of the invention, instead of using two thermoplastic sheets a single sheet is folded back upon itself and fastened to a tab at the fold on opposite end or one of the sheets can be extended to form a tab. This structure is particularly applicable to the lamination of pages in a booklet, such as a passport.

At least one of the sheets is preferably transparent (at least after the lamination operation) and ordinarily both sheets would be transparent. At least one of the sheets must have a heat activated adhesive or a thermoplastic coating and normally both sheets are so constituted.

The sheets are preferably of Mylar film coated on the inside surfaces with a thin layer of a thermo-plastic material such as a polyolefin, suitably polyethylene.

Various other objects and features of the invention will be brought out in the balance of the specification.

DESCRIPTION OF THE PREFERRED EMBODIMENTS

Figure 1:
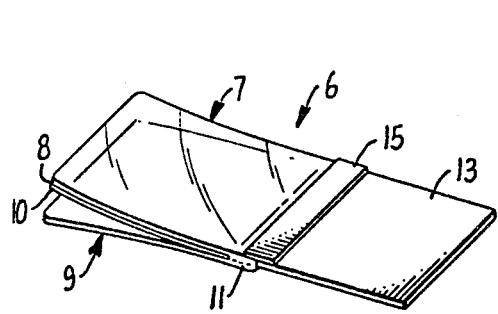
FIG. 1 is a perspective view of a packet embodying the present invention.
Figure 2:
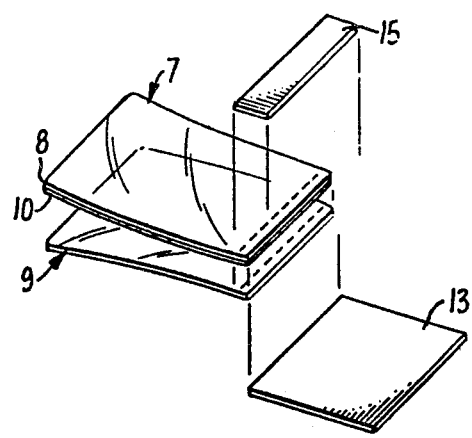
FIG. 2 is an exploded view of the various parts making up the packet of FIG. 1.

Referring now to the drawings by reference characters and particularly FIGS. 1 and 2, one structure made in accordance with the invention consists of an upper sheet generally designated 7 and a lower sheet generally designated 9 of preferably transparent thermoplastic laminating material suitable for use in a laminating press. The upper sheet 7 can consist of a film 8 of an inert plastic such as Mylar with a coating 10 of a heat activated adhesive such as polyethylene. The lower sheet 9 is preferably of the same structure or the coating can be omitted. The upper and lower sheets are bound on one edge as shown at 11. This binding can be accomplished by passing the sheets through a maching for heat sealing the edges or by means of any conventional adhesive. A tab 13 of a non-heat sealable material such as ordinary paper or cardboard is attached to one end of the packet. This tab abuts one end of the packet and is held to the upper sheet by means of a strip or tape 15. Strip 15 is caused to adhere to both the tab 13 and the upper sheet 7 to hold the parts in proper relationship. Preferably strip 15 is Mylar coated with a thermoplastic material of a higher melting point than the thermoplastic material in the packet itself. Or an adhesive is used which is not hardened by storage or heat so that it can be peeled off at the desired time. Ordinary pressure sensitive adhesives are suitable for this purpose. Preferably strip 15 adheres to tab 13 more strongly than it does to sheet 7 so that when one peels off tab 13, at the completion of a lamination operation, the strip 15 will stay on the tab 13 and make a clean separation with the sheet 7. Various ways can be used to accomplish this. Since most pressure sensitive materials adhere more strongly to a relatively porous material such as paper than they do to a laminating plastic sheet, the strip 15 will inherently peel off with the tab 13 and will become cleanly detached from the sheet 7. Another way of accomplishing this is to make the strip 15 overlap a greater distance on the tab 13 than on the sheet 7 so that there will be more area for adhesion to sheet 13 than to sheet 7. This is best seen in FIG. 4.

Figure 3:
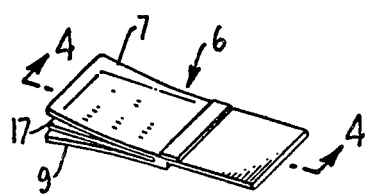
FIGS. 3 A, B, C, D show a series of steps employed in utilizing the packet of FIG. 1 in a simple laminating machine.
Figure 3:
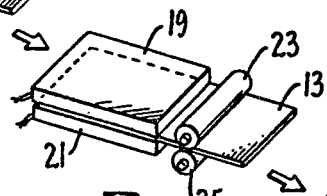
Figure 3:
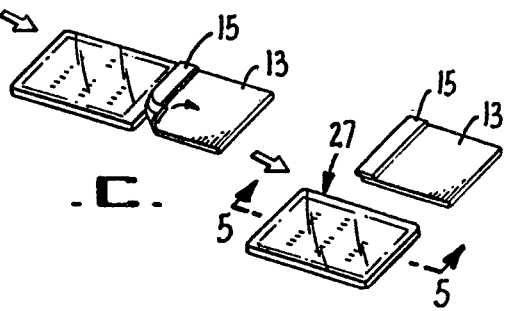

In FIG. 3 the various steps of utilizing a packet made in accordance with the present invention are illustrated. Here the packet, generally designated 6, is spread open slightly so that an item to be laminated, such as an identification card 17 can be placed between the upper sheet 7 and the lower sheet 9. One now places the heat-sealable portion of the packet between heated platens 19 and 21 with the tab 13 extending outside of the platens. Tab 13 may extend between two pressure rollers 23 and 25. When the packet has become sufficiently heated, one grasps tab 13 and pulls it through the pressure rollers 23 and 25 completing the sealing operation. One now peels off the tab 13 including the connecting strip 13 as is shown in FIG. 3C. This leaves the completed laminating packet designated 27 while tab 13 and the connecting strip 15 are discarded.

Figure 4:
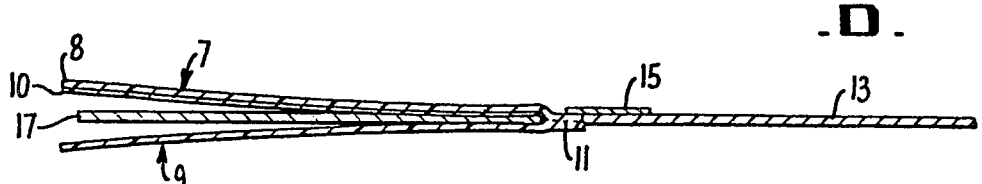
FIG. 4 is an enlarged section on the line 4—4 of FIG. 3A.

The exact structure of the packet is best seen in FIG. 4, wherein the upper sheet 7 and the lower sheet 9 are shown sealed together at 11. The tab 13 is shown connected to the upper sheet 7 by means of the tape 15. As shown by FIG. 4, the tape 15 overlaps the upper sheet 7 by a short distance while it laps over the tab 13 for a substantial distance. Thus, if the adhesion of tape 15 is equal to or even greater on the plastic sheet 7 than it is on the sheet 13 per unit of area, the tape 15 will inherently strip off of the sheet 7 and adhere to the sheet 13.

Figure 5:
FIG. 5 is an enlarged section on the line 5—5 of FIG. 3D.

In FIG. 5 the completed structure 27 is shown in section and will be seen that the edges as at 29 are sealed together so that the card 17 is completely encased in plastic.

Figure 6:
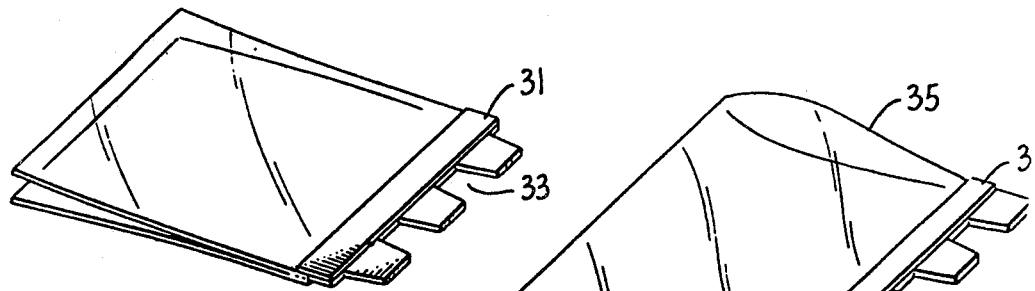
FIG. 6 is a perspective view of a laminating packet employing a plurality of notches on the pull strip.

In FIG. 6 the structure is substantially the same except that here the tab 31 is provided with a series of notches 33. Although in this case only two notches have been shown, a larger number of notches might be employed. These notches serve the dual purpose of forming accurate locating means of the packet within the laminating machine with the tab between the pressure rollers and also prevent the laminating machine from being used with a packet or with individual sheets not specifically designed for that machine.

Figure 7:
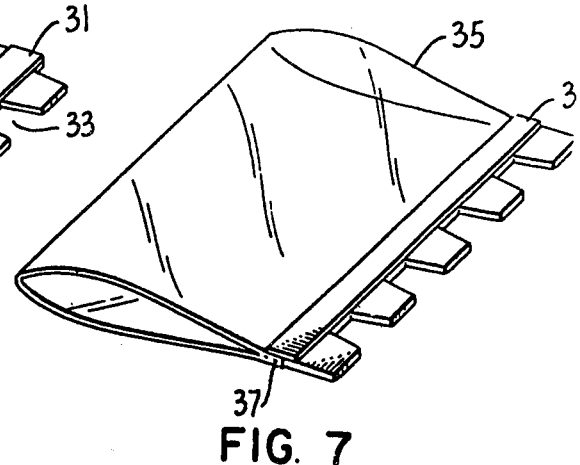
FIG. 7 is a perspective view of a laminating packet wherein the laminating sheet forms a continuous loop.

FIG. 7 shows another structure wherein a continuous fold of laminatable plastic 35 is employed with the edges brought together and secured at 37. The tab 39 is attached as previously described. This structure is frequently advantageous since only a single sheet is employed and in some manufacturing operations it is simpler to handle the single sheet folded upon itself than two individual sheets.

Figure 8:
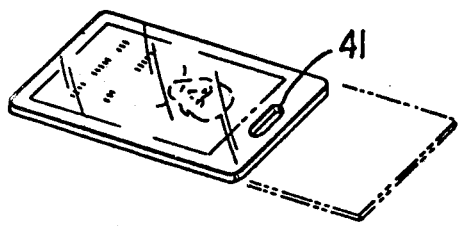
FIG. 8 is a perspective view of the laminated article employing pre-punched laminating sheets.

In FIG. 8, a laminating packet with a peel off tab to be used as an identification tag is shown wherein the laminating sheets have an aperture 41 formed therein so that the finished article can be hung on a strap or the like. This is particularly advantageous for use in identification badges. Although an oval slot is shown which is performed into the upper and lower sheets of the packet, obviously a slot or hole of any size or shape might be used.

Figure 9:
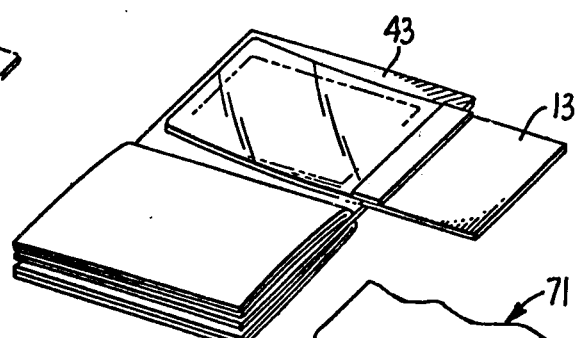
FIG. 9 is a diagrammatic view showing how a packet can be employed in laminating a page of a book or the like without removing the sheet from the book.

FIG. 9 illustrates how the packet of the present invention can be used with the page of a book without removing the page from the book. This is particularly advantageous for use in passports and similar identifying documents where it is important that foregery be avoided. As can be seen, the page 43 is placed between the upper and lower sheets 7 and 9, or in the case of a single sheet within the fold of the sheet 35 with the tab 13 extending from the booklet. This can be passed through a laminating machine previously described but with cantilever rollers to allow the other pages of the book to move freely. The tab is torn off to leave the thermoplastic film over the picture or written material to be protected on that page.

Figure 10:
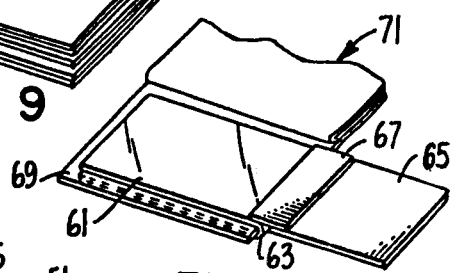
FIG. 10 is a view similar to FIG. 9 showing a single, folded over heat sealing sheet.

In FIG. 10 a structure is shown wherein a single sheet of heat-sealing material is folded upon itself and the tab attached at the fold end. This is in contrast with the structure shown in FIG. 7 wherein the tab is opposite the fold. Here a single sheet 61 is folded at 63 and tab 65 is attached to the fold end by tape 67. In FIG. 10 the packet is being used to laminate a page 69 of the book 71.

Figure 11:
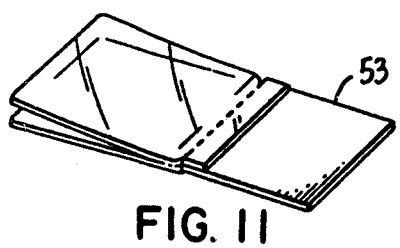
FIG. 11 is a perspective view of another embodiment of the invention utilizing a perforated tear-off strip.
Figure 12:
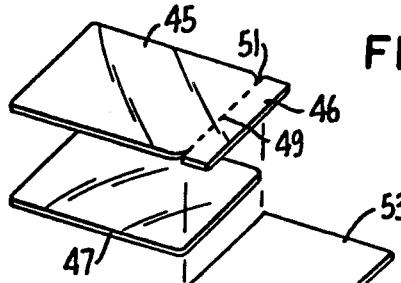
FIG. 12 is an exploded view of the structure of FIG. 10 showing the parts which constitute the packet.
Figure 13:
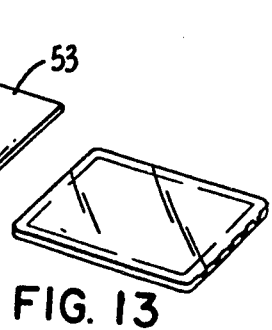
FIG. 13 is a perspective view of the laminated sheet utilizing the packet of FIG. 10.

Although the use of a heat sealable tape is preferred for causing the tab to initially adhere to the balance of the packet, other tear-off systems can be used such as the provision of a perforated sheet. Thus, referring to FIGS. 11 through 13 an upper sheet 45 is employed which is somewhat longer than the lower sheet 47. The portion of sheet 45 which extends beyond 47 is perforated as at 49 and a notch 51 can be made at each edge of the sheet. The sheets are superimposed and that portion of 46 of the upper sheet which extends beyond the lower sheet 47 is glued or otherwise affixed to a tab 53. After the lamination operation is conducted as previously described, the tab is merely torn off along the perforations 49, leaving the finished structure shown in FIG. 13.

Figure 14:
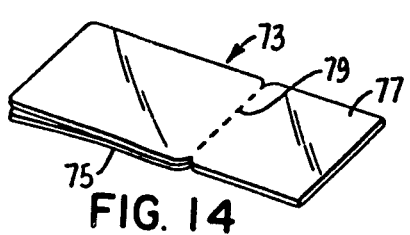
FIG. 14 shows another embodiment of the invention wherein one of the laminating sheets is extended to form a tab.

In FIG. 14 there is shown a packet wherein one of the sheet is extended to form the tab. Here the upper sheet 73 is longer than the lower sheet 75 and that portion of sheet 73 which extends beyond 75 forms a tab 77. The line defining the tab is perforated at 79 so that the tab can be torn off after the laminating operation. That portion of sheet 73 which forms the tab is preferably not provided with a heat-sealing coating.

The heat sealing sheets of the present invention are preferably made of a relatively inert plastic such as Mylar which is stable under the temperature conditions of the laminating operation. Normally at least one of the sheets would be transparent although this is not necessary when the lamination process is used for purely mechanical purposes. The inner surface of at least one of the sheets, and preferably both, is coated with a material which is thermoplastic and polyolefins such as polyethylene are suitable for this purpose.

Although certain specific embodiments of this invention have been described, it is obvious to those skilled in the art that many variations can be made without departing from the spirit of this invention.

I claim:

1. A method for laminating an object comprising the steps of:
   (a) providing a laminating machine having a heating means and pressure means;
   (b) providing a laminating packet having first and second sheets of a heat laminating material, said first and second sheets being of substantially the same size, lying over each other, and being connected together along one marginal edge, a detachable tab extending from the marginal edge away from the sheets;
(c) inserting an object to be laminated between the first and second sheets;
(d) inserting the packet and object into the heating means of the laminating machine, and then heating the packet;
(e) pulling the laminating packet and object through the pressure means by pulling on the tab until the packet is removed from the machine; and
(f) tearing away the detachable tab.

2. The method of claim 1 wherein the pressure means comprises pressure rollers and the tab is positioned between the pressure rollers and external to the machine prior to pulling the laminating packet through the pressure rollers.

3. A method for laminating an object comprising the steps of:
(a) providing a laminating machine having a heating means and pressure means;
(b) providing a laminating packet having first and second sheets of a heat laminating material, said first and second sheets being of substantially the same size, lying over each other, and being connected together along one marginal edge, a detachable tab extending from the marginal edge away from the sheets;
(c) inserting an object to be laminated between the first and second sheets;
(d) positioning the packet and object into the heating means of the laminating machine with the tab abutting against a portion of the machine to locate the packet in a predesigned position, and then heating the packet;
(e) pressing the packet and removing the packet from the machine; and
(f) tearing away the detachable tab.

4. The method of claim 3 wherein the pressure means comprises pressure rollers and the tab is positioned between the pressure rollers.

5. A method of claim 3 wherein the tab has notches which engage a portion of the machine to align the packet.

6. A method of claim 3 wherein the tab cooperates with the laminating machine to permit operation thereof, said machine not operating if said tab is not present.

7. A method for laminating an object comprising the steps of:
(a) providing a laminating maching having a heating means and pressure means;
(b) providing a laminating packet having first and second sheets of a heat laminating material, said first and second sheets being of substantially the same size, lying over each other, and being connected together along one marginal edge, a detachable tab extending from the marginal edge away from the sheets;
(c) inserting an object to be laminated between the first and second sheets;
(d) positioning the packet and object into the heating means of the laminating machine with the tab cooperating with the machine to permit operation thereof, and then heating the packet;
(e) pressing the packet and removing the packet from the machine; and
(f) tearing away the detachable tab.

8. The method of claim 7 wherein the machine does not operate if the tab is not present.

9. The method of claim 7 wherein notches are provided in the tab which cooperate with the machine to permit operation thereof.

* * * * *